(12) United States Patent
Nakahara et al.

(10) Patent No.: US 7,052,533 B2
(45) Date of Patent: May 30, 2006

(54) FILTER ELEMENT, METHOD FOR MANUFACTURE THEREOF, AND FILTER USING SAID ELEMENT

(75) Inventors: Fumio Nakahara, Okayama-ken (JP); Masaki Fukuura, deceased, late of Okayama-ken (JP); by Teruyo Fukuura, legal representative, Okayama (JP); Takayuki Yoshikawa, Okayama-ken (JP)

(73) Assignee: Kuraray Chemical Co., Ltd., Bizen (JP)

( * ) Notice: Subject to any disclaimer, the term of this patent is extended or adjusted under 35 U.S.C. 154(b) by 0 days.

(21) Appl. No.: 10/473,866

(22) PCT Filed: Apr. 1, 2002

(86) PCT No.: PCT/JP02/03244

§ 371 (c)(1),
(2), (4) Date: May 27, 2004

(87) PCT Pub. No.: WO02/081055

PCT Pub. Date: Oct. 17, 2002

(65) Prior Publication Data
US 2005/0092675 A1   May 5, 2005

(30) Foreign Application Priority Data
Apr. 4, 2001 (JP) ............................ 2001-105930

(51) Int. Cl.
  *B01D 53/04* (2006.01)
(52) U.S. Cl. ............................ 96/154; 96/135; 55/524; 55/528; 55/DIG. 5
(58) Field of Classification Search ............... 95/58, 95/59, 61; 96/27, 69, 135, 153, 154; 55/524, 55/528, DIG. 5
See application file for complete search history.

(56) References Cited

U.S. PATENT DOCUMENTS

| 3,266,973 | A | * | 8/1966 | Crowley | .................. 162/164.2 |
| 3,998,988 | A | | 12/1976 | Shimomai et al. | |
| 4,992,319 | A | * | 2/1991 | Kurosawa et al. | ........... 428/116 |
| 5,124,177 | A | * | 6/1992 | Kasmark et al. | ............ 427/202 |
| 5,141,643 | A | | 8/1992 | Breitbach et al. | |
| 5,221,573 | A | * | 6/1993 | Baigas, Jr. | .................. 428/212 |
| 5,237,945 | A | * | 8/1993 | White | ......................... 112/420 |
| 5,328,758 | A | * | 7/1994 | Markell et al. | ............. 442/351 |
| 5,338,340 | A | * | 8/1994 | Kasmark et al. | .............. 96/135 |
| 5,486,410 | A | * | 1/1996 | Groeger et al. | ............. 442/353 |
| 5,662,728 | A | * | 9/1997 | Groeger | ....................... 96/153 |
| 5,951,744 | A | * | 9/1999 | Rohrbach et al. | ............. 96/154 |
| 5,965,091 | A | * | 10/1999 | Navarre et al. | ............. 422/122 |
| 6,024,782 | A | * | 2/2000 | Freund et al. | ................. 96/154 |
| 6,302,946 | B1 | * | 10/2001 | Cronia et al. | ................. 96/154 |
| 6,331,351 | B1 | * | 12/2001 | Waters et al. | ............ 428/317.7 |
| 6,413,303 | B1 | * | 7/2002 | Gelderland et al. | ........... 96/135 |
| 6,423,123 | B1 | * | 7/2002 | Rosenberg et al. | .......... 96/154 |
| 6,429,165 | B1 | * | 8/2002 | Nastke et al. | ............... 502/159 |
| 6,447,584 | B1 | * | 9/2002 | Kishkovich et al. | .......... 96/153 |
| 6,527,834 | B1 | * | 3/2003 | Jorder et al. | .................... 96/68 |
| 2003/0089092 | A1 | * | 5/2003 | Bause et al. | .................. 55/524 |
| 2004/0118287 | A1 | * | 6/2004 | Jaffe et al. | ..................... 96/121 |
| 2004/0144255 | A1 | * | 7/2004 | Lersch et al. | .................. 96/69 |
| 2004/0163540 | A1 | * | 8/2004 | Mori et al. | .................... 96/134 |
| 2005/0000363 | A1 | * | 1/2005 | Minemura et al. | ............ 96/154 |

FOREIGN PATENT DOCUMENTS

| EP | 0 825 286 | 2/1998 |
| JP | 47-15383 | 8/1972 |
| JP | 50-53954 | 5/1975 |
| JP | 50-55967 | 5/1975 |
| JP | 50-92554 | 7/1975 |
| JP | 51-145483 | 12/1976 |
| JP | 01-111441 | 4/1989 |
| JP | 3-151012 | 6/1991 |
| JP | 2000-153114 | 6/2000 |

* cited by examiner

*Primary Examiner*—Robert H. Spitzer
(74) *Attorney, Agent, or Firm*—Oblon, Spivak, McClelland, Maier & Neustadt, P.C.

(57) ABSTRACT

The invention provides a filter element exhibiting an excellent deodorizing and adsorbing function with low pressure drop, as well as to a method for its manufacture and a filter using the element. The filter element is manufactured by coating a base fabric with an adhesive and allowing the fabric to move in an electrostatic field formed by a high voltage generating device to allow pulverized adsorbent powder with a specific mean particle size and standard deviation to electrostatically adhere to the base fabric surface. The filter element can also be manufactured by dispersing a pulverized adsorbent powder on the surface of a base fabric comprising heat-fusible fibers, and then partially fusing the heat-fusible fibers by heating to attach them to the adsorbent powder and allow the adsorbent powder to adhere to the base fabric surface.

20 Claims, No Drawings

FILTER ELEMENT, METHOD FOR MANUFACTURE THEREOF, AND FILTER USING SAID ELEMENT

TECHNICAL FIELD

The present invention relates to a filter element, to a method for its manufacture and to a filter using the element. More specifically, the invention relates to a filter element having pulverized adsorbent powder attached to the surface of an adhesive-coated base fabric and exhibiting excellent deodorizing and adsorbing functions with low pressure drop, as well as to a method for its manufacture and a filter using the element. Since the filter element of the invention has extremely low pressure drop relative to the amount of the activated carbon adhered to the base fabric, a filter employing the element can be suitably used as a filter for a variety of uses, including automobile cabin filters, indoor air purification filters and air conditioner filters.

BACKGROUND ART

Activated carbon has been widely used in the past for noxious gas adsorption removal, gas purification and separation/recovery, gas occlusion, molecular sieve applications, and for decoloring purification in fields relating to foods or the chemical industry, water treatment, electric double layer condensers and the like, but activated carbon is also commonly used for various filters because of its excellent ability to adsorb and remove a variety of malodorous substances across a wide range. Activated carbon for filters is often used in the form of powder or in pulverized form packed into a container, but it can also be conveniently used in many cases in the form of molded tubes or sheets. In recent years, however, despite high expectations for such activated carbon filters, their uses have been limited because of a high degree of pressure drop.

Many types of filters modified to reduce pressure drop have been proposed to date, such as an adsorption filter comprising an adsorbent, a fine particle binder and reinforcing fibers, disclosed in Japanese Unexamined Patent Publication No. HEI 3-151012. In this filter, the flat filter is made of particulate activated carbon coated with a thermoplastic material such as polyethylene, with packing in a frame set on a polypropylene net, while an example is given of stacking polyethylene nets for air purification.

Japanese Unexamined Patent Publication No. HEI 3-238011 discloses an air purification filter comprising a laminated combination of an electret filter and a flat sheet. This filter reduces pressure drop by employing a corrugated sheet. Also, Japanese Unexamined Patent Publication No. HEI 4-74505 discloses an air purification filter element with low pressure drop by laminating an electret filter and an adsorbent-containing filter into an integrally formed pleat. However, these filters still exhibit high pressure drop of the flat sheet to which the activated carbon is attached, and hence their uses are often restricted.

On the other hand, there is disclosed in Japanese Unexamined Patent Publication No. HEI 5-177133 an activated carbon-adhered fiber sheet wherein powdered activated carbon is adhered to fibers without an adhesive. This sheet is obtained by dispersion, opening and activation of fibers such as glass fibers and a resin powder using an opening cylinder. Also, Japanese Unexamined Patent Publication No. HEI 6-219720 discloses activated carbon with a specified surface acidity, while Japanese Unexamined Patent Publication No. HEI 9-271616 discloses a deodorizing filter material obtained by forming an activated carbon layer on one surface of a fiber sheet and forming an activated inorganic adsorbent layer on the other surface. Also, U.S. Pat. No. 5,124,177 and U.S. Pat. No. 5,338,340 both disclose filters having activated carbon dispersed in an adhesive-coated sheet, where an air jet is sprayed to attach the activated carbon to the sheet.

However, although the techniques disclosed in these publications can provide firm attachment of the activated carbon to the sheet because they both employ pressing with a roll and high-pressure air blowing to attach the activated carbon to the sheet, it is still difficult to avoid a large pressure drop due to external pressing force on the activated carbon.

The present applicant had previously discovered that an easily fabricated flat filter with excellent adsorption performance can be produced by a fluidized adhesion method and has already filed Japanese Patent Publication No. HEI 9-19920 as a patent application therefor (Japanese Unexamined Patent Publication No. HEI 10-204384). This method is a method of manufacturing a filter by attaching an adhesive to a sheet and passing the sheet through a fluidized bed of adsorbent particles, pressing at a pressure roll, shedding the insufficiently adhered particles and drying, and this may be said to be a highly efficient flat filter manufacturing method from the standpoint of production.

According to this method, however, the adsorbent such as activated carbon adheres in a randomly laminated fashion to the adhesive-coated sheet, and therefore the obtained filter does not always have low pressure drop. In addition, although the insufficiently adhered particles are shed by vibration with a vibrator, the activated carbon adhered to the base fabric is sometimes shed during use, even after this shedding.

By utilizing a technique known as electrostatic setting, which is completely different from the manufacturing methods described above, it is possible to obtain an activated carbon sheet with low pressure drop and firm anchoring of activated carbon to the sheet. As prior art adsorbent materials or deodorant materials comprising activated carbon fibers set in a sheet using the electrostatic setting technique, for example, Japanese Examined Patent Publication No. SHO 57-31453 discloses an adsorbent material comprising activated carbon fibers set into a base material, and Japanese Unexamined Utility Model Publication No. HEI 6-85034 discloses a deodorant material comprising activated carbon fibers electrostatically set on the surface of a sheet-like base material precoated with an adhesive on the back side. Both of these methods employ activated carbon fibers as the material, but when the purpose of a filter is considered, since using activated carbon fibers means that a lower amount is used than when using particulate or pulverized activated carbon, the use of particulate or pulverized activated carbon is preferred from the standpoint of functional life.

As an example of the electrostatic setting technique being applied to produce an adsorbent layer using activated carbon as the material, Japanese Unexamined Patent Publication No. SHO 50-144680 discloses a method of forming an adsorbent layer wherein an adsorbent element such as activated carbon is evenly adhered and anchored as an adsorbent layer by electrostatic adhesion. Also, Japanese Unexamined Patent Publication No. SHO 63-274429 describes a composite adhesive sheet wherein a sticking agent layer is provided on a porous sheet material and an adsorbent layer of activated carbon powder is provided on the sticking agent layer by electrostatic setting.

However, the adsorbent layer disclosed in Japanese Unexamined Patent Publication No. SHO 50-144680 uses beady activated carbon, and being in the form of beads it does not always adhere satisfactorily to the sheet, such that a cost-effective product cannot be obtained. The adsorbent sheet disclosed in Japanese Unexamined Patent Publication No. SHO 63-274429 is used as a tobacco filter and therefore employs fine powdered activated carbon, with the binder being printed at a prescribed spacing in the porous sheet and the activated carbon powder being attached to the binder, and therefore the air permeability resistance is significant, as is also mentioned in the examples.

Fiber structures with high-performance permeability are also disclosed in Japanese Unexamined Patent Publication No. HEI 10-102366, Japanese Patent Publication No. 2,818, 693 and U.S. Pat. No. 5,486,410. These comprise adsorbent particles of activated carbon or the like with heat-fusible fibers, and are described as having high air permeability. However, the fiber-like structures disclosed in these publications have a structure in which the adsorbent particles are tightly held in the heat-fusible fibers, and are therefore described as having high air permeability, but considering the structure, a large pressure drop is unavoidable.

Low pressure drop is an important function required for filters, but despite numerous attempts to achieve it, no fully satisfactory solution has yet been found. It is therefore an object of the present invention to provide a new filter element with firm adhesion of the adsorbent, without impairment of deodorizing function or adsorption performance, and with low pressure drop, as well as a method for its manufacture and a filter using the element.

DISCLOSURE OF THE INVENTION

As a result of diligent research directed toward achieving the object stated above, the present inventors completed the invention upon finding that it is possible to obtain a filter element without reduced deodorizing function or adsorption performance and with low pressure drop by utilizing static electricity to attach a pulverized adsorbent having a specific mean particle size and a specific standard deviation for the particle size distribution, as a first method, or by dispersing a pulverized adsorbent powder on the surface of a base fabric composed of heat-fusible fibers and heating to partially fuse the heat-fusible fibers for attachment of the adsorbent powder to the base fabric surface, as a second method. In other words, one aspect of the present invention provides a filter element having pulverized adsorbent powder adhered to an adhesive-coated base fabric, characterized in that the filter element satisfies the relationship that $0 \leq A \leq 1.1$ mB+C and m=0.28–0.0005 $D_{50}$, with the proviso that $0 < C \leq 15$, where $D_{50}$ (µm) is the 50% particle diameter of the adsorbent powder, B (g/m$^2$) is the amount of adhesion of the adsorbent to the base fabric, A (Pa) is the pressure drop of the filter as measured at room temperature under an air flow rate of 1 m/sec, and C (Pa) is the pressure drop of the base fabric when coated with the adhesive and dried.

Another aspect of the invention provides a method for manufacture of a filter element by coating a base fabric with an adhesive and allowing the fabric to move in an electrostatic field formed by a high voltage generating device to allow pulverized adsorbent powder to electrostatically adhere to the base fabric.

Still another aspect of the invention provides a method for manufacture of a filter element by dispersing a pulverized adsorbent powder on the surface of a base fabric comprising heat-fusible fibers, and then partially fusing the heat-fusible fibers by heating to allow the adsorbent powder to adhere to the base fabric surface.

Still another aspect of the invention provides a filter using the filter element described above.

BEST MODE FOR CARRYING OUT THE INVENTION

As pulverized adsorbent powders to be used for the invention there may be mentioned activated carbon, activated alumina, activated clay, silica gel, zeolite or the like. As activated carbon forms there may be mentioned coconut shell, palm coconut, fruit seed, sawdust, eucalyptus, pine or other plant-based, coal-based or petroleum-based coke materials and pitch carbides obtained from these starting materials, phenol-based resins, vinyl chloride-based resins, vinylidene chloride-based resins and vinyl alcohol-based resins. The shape and size of the adsorbent are not particularly restricted, but the adsorbent will usually be pulverized, granular, fibrous or cylindrical with a size of about 10–1000 µm.

The base fabric for adhesion of the adsorbent is preferably one with air permeability, of which examples include non-woven fabrics such as urethane foam, spun-bond and melt-blown nonwoven fabrics, dry nonwoven fabrics, wet nonwoven fabrics (paper), nonwoven fabrics made of polymers such as polyesters, polyamides, polypropylene and the like as the materials, as well as woven fabrics, cellulose and the like. These may if desired be subjected to processing such as electret working or the like. There are no particular restrictions on the adhesive coated onto the base fabric, and for example, a dispersion- or solution-type adhesive such as any of various latex- or acrylic-based emulsions, or an adhesive or tackifier composed of a synthetic resin such as a vinyl chloride-based resin, vinylidene chloride-based resin or acetic acid ester-based resin may be used. Among these, acrylic-based emulsions are preferred.

The main feature of the filter element of the invention is that of extremely low pressure drop for the amount of adhesion of the adsorbent, compared to conventional filters. According to the invention, the pressure drop of the filter element and of the dried base fabric after coating of the adhesive is measured using a device as prescribed by JIS B 9901-1997, at room temperature (normally 25° C.) under an air flow rate at 1 m/sec. According to the invention, it is necessary to satisfy the relationship that $0 \leq A \leq 1.1$ mB+C and m=0.28–0.0005 $D_{50}$, with the proviso that $0 < C \leq 15$, and preferably that $0 \leq A \leq 1.05$ mB+C and m=0.28–0.0005 $D_{50}$, with the proviso that $0 < C \leq 8$, where $D_{50}$ (µm) is the 50% particle diameter of the adsorbent powder, B (g/m$^2$) is the amount of adhesion of the adsorbent powder to the base fabric, A (Pa) is the pressure drop of the filter element, and C (Pa) is the pressure drop of the base fabric coated with the adhesive and dried. The amount of adhesion of the adsorbent powder according to the invention is represented in terms of the weight of the adsorbent attached per unit area of the base fabric.

In the filter element of the invention, the 50% particle diameter $D_{50}$ of the adsorbent powder is 10–1000 µm and the standard deviation σ g for the particle size distribution of the adsorbent powder is preferably 1.1–2.0, while the 50% particle diameter $D_{50}$ is more preferably 200–600 µm.

In the filter element of the invention, the adsorbent powder is adhered to one or both sides of the base fabric surface, but adhesion to both sides is preferred from the standpoint of superior adsorption performance. Because the filter element of the invention is used as a filter in combination with a cover sheet or the like, formation into a pleat form is preferred in practical terms. Activated carbon is preferred as the adsorbent from the standpoint of achieving excellent deodorant performance and adsorption performance and superior adhesion to the base fabric.

The base fabric used may be heat-fusible fibers produced from a polyamide such as nylon, a polyester such as polyethylene terephthalate (PET) or polybutylene terephthalate (PBT), a modified polyester, or a polyolefin such as polyethylene or polypropylene. The base fabric is preferably in the form of a nonwoven fabric, and the nonwoven fabric is preferably made of core-sheath fibers composed of heat-fusible fibers. The core-sheath fibers preferably have a core section of PET, and a sheath section of modified PET. The nonwoven fabric employing the heat-fusible fibers is preferably one with a mass per unit area of 40–70 g/m$^2$, a thickness of 0.5–3 mm and containing fibers with a fineness of 10–20 dtex. The fibers may also be mixed fibers so long as the fineness is 10–20 dtex. The heat-fusible fibers may also be suitably used in a base fabric produced utilizing the principle of electrostatic setting.

The filter element of the invention is preferably manufactured utilizing the principle of electrostatic setting, or by heating and partially fusing heat-fusible fibers for attachment of the adsorbent powder to the base fabric surface, and when this method is employed, the adsorbent preferably has a specific mean particle size and a specific standard deviation, as mentioned above. That is, according to the invention, the mean particle size of the adsorbent powder is 10–1000 μm and preferably 200–600 μm, and the standard deviation σ g for the particle size distribution of the adsorbent powder, as defined by (15.87% particle size on a cumulative filter)/(50% particle size $D_{50}$), where $D_{50}$ (μm) is the 50% particle diameter, is preferably 1.1–2.0. Using an adsorbent with such a particle size distribution according to the invention can reduce the pressure drop of the filter element for the amount of adhesion of the adsorbent used, and provide excellent adsorption performance.

For production of a filter element of the invention utilizing the principle of electrostatic setting, first an electrostatic field is formed using a high voltage generating device. For example, a high voltage may be applied to an electrode with a high voltage generating device to generate static electricity, and the base fabric may be passed through the electrostatic field at a prescribed distance along the electrode. The moving speed of the base fabric and the distance between the base fabric and the electrode may be appropriately determined based on the size of the generated electrostatic field, the type of adsorbent used and the properties of the adhesive, but for most purposes the distance from the electrode may be 5–20 cm and the moving speed may be 1–10 m/min.

By providing an electrode on one side of the base fabric and running the adhesive-coated base fabric through the field, it is possible to adhere the adsorbent to the base fabric. For adhesion of the adsorbent on both sides of the base fabric, the adhesive may be coated onto both sides of the base fabric and the procedure described above repeated twice, or else electrodes may be provided on both sides of the base fabric and the base fabric passed through the field for adhesion of the adsorbent to both sides simultaneously. The base fabric may be transported horizontally through the electrostatic field, but moving the base fabric vertically up or down will tend to make the adsorbent adhered to the base fabric densely. This is preferred for increasing the adsorption effect and reducing the pressure drop of the filter element. Here, horizontal and vertical include slanted states and are not necessarily limited to horizontal and vertical in the strict sense.

Although the reason for the excellent effects of the filter element of the invention is not completely understood, it is thought that, for example, when the filter element is manufactured utilizing the principle of electrostatic setting, the randomly-shaped particles adhere densely in a single-layer fashion during adhesion of the pulverized adsorbent particles onto the base fabric in the electrostatic field, being oriented in the vertical direction relative to the base fabric. Also, if the base fabric is moved downward or upward, the larger particles of the provided adsorbent fall further downward becoming the first to adhere, with the smaller particles adhering later, thereby allowing the smaller particles to be incorporated between the larger particles and resulting in the dense adhesion of the adsorbent particles to exhibit excellent adsorption performance.

For production of a filter element of the invention using heat-fusible fibers as the base fabric, the adsorbent powder may be evenly dispersed on the base fabric composed of the heat-fusible fibers, and then heating performed to partially fuse the heat-fusible fibers and adhere the adsorbent powder to the base fabric surface. In this case, the adhesive may be used in combination with a heat-fusible adhesive such as polyethylene powder. There are no particular restrictions on the heating means, and for example, it may be jet heating with heated air or irradiation with infrared rays. The reason for which a filter element using heat-fusible fibers according to the invention exhibits low pressure drop without impairment of deodorizing function or adsorbing function is not fully understood, but it is believed that the low pressure drop without impairment of deodorizing function or adsorbing function is exhibited due to the low contact surface between the heat-fusible fibers and the adsorbent powder, and due to the bulky nonwoven fabric composition.

The filter element may also be fabricated using a base fabric wherein the heat-fusible fibers have been subjected to embossing to form protrusions on one or both sides. When such a filter element is used in combination with a cover sheet, described below, on either the front or the back section, the cover sheet reliably bonds via the protrusions on the base fabric, resulting in a desirable situation of lower fusion bonding area and therefore low pressure drop. The shapes, sizes and number of the protrusions is not restricted, and may be appropriately set as desired.

The filter element obtained in this manner is used as a filter in combination with a cover sheet, and the pressure drop is low even when used as a filter. The filter element is preferably provided with cover sheets on both sides. The filter element may also be suitably employed as a combination of an air filter and a cover sheet. It is preferred to use a nonwoven fabric as the air filter and/or the cover sheet, and the nonwoven fabric used is preferably composed of the core-sheath type fibers described above. PET is preferred as the core and sheath sections of the core-sheath fibers in the nonwoven fabric. An electret-treated nonwoven fabric may also be used as the air filter.

The filter element preferably has a pleated structure, but for increased filter strength a metallic reinforcing material such as aluminum, iron, copper, titanium, stainless steel or the like, or a plastic reinforcing material such as polyethylene, polypropylene, polyester or the like may be inserted and set therein as appropriate. Such reinforcing materials are preferably in the form of a comb, sheet or mesh.

The filter element of the invention may be used in a filter structure, but preferably its usefulness is extended by combining it with a material having a catalytic function. Filters with composite functions are known, as described in Japanese Unexamined Patent Publication No. HEI 9-271616, but no filters are known comprising materials with catalytic functions. Materials with catalytic functions include, for example, activated carbon in combination with various metals such as copper, silver, gold, iron, manganese, platinum and palladium chloride, and their molded products may be used if necessary. In particular, activated carbon impregnated with palladium chloride, or its molded product, may be used for removal of gases such as ethylene or carbon monoxide, to thereby notably increase the effect of the filter. The material with a catalytic function may be provided at either the front or back part of the filter element, but for example, if an adsorption filter composed of activated carbon with a desulfurizing effect is set at the front part and a filter with a function of decomposing carbon monoxide, composed of palladium chloride or the like, is set at the back part, for treatment of noxious gas, the life of the back filter with the catalytic function can be extended and it is preferable. Various combinations of filter elements of the invention and materials with catalytic functions may of course be used. The invention will now be explained in greater detail through the following examples.

EXAMPLE 1

A PET nonwoven fabric (SKC50 by Hikotomi Industrial Co., Ltd., mass per unit area: 50 g/m$^2$, pressure drop of nonwoven fabric alone: 6 Pa) was used as the base fabric, and an acrylic-based emulsion (Nipol LX820A acryl emulsion, solid portion: 22 g/m$^2$, product of Nihon Zeon Co., Ltd.) was evenly coated onto both sides of the base fabric with a gravure coater (Asahi Precision Roll Lattice Model 35).

A voltage of 23 kV was applied using an electrostatic tester by Kasuga Electric Works Ltd. to produce an electrostatic field. The electrode spacing distance was 10 cm, and the adhesive-coated base fabric (30 cm×1 m) was passed through horizontally at a speed of 1 m/min. GG26/60 35N ($D_{50}$: 430 μm, σ g: 1.2) activated carbon by Kuraray Chemical Co., Ltd. was supplied at the same time, and the activated carbon was adhered thereto. The adhesion of the activated carbon onto the base fabric, after removal of the moisture in the adhesive using a roller drier, was 250 g/m$^2$ on both sides of the base fabric.

The pressure drop of the filter element was measured to be 21 Pa by passing air through at 1 m/sec at 25° C. The pressure drop of the dried base fabric after coating of the adhesive was 7.5 Pa. The relationship between pressure drop and amount of the activated carbon powder adhered to the base fabric satisfied the relationship that $0 \leq A \leq 1.05$ mB+C and m=0.28−0.0005$D_{50}$, where $0<C\leq 8$. The adsorptions (%) of toluene, sulfur dioxide and n-butane after 1 minute of gas flow were measured according to JIS B 9901-1997, as indices of the adsorption performance. The results are shown in Table 1.

EXAMPLE 2

A filter element was manufactured in the same manner as Example 1, except that the activated carbon was adhered only to one side of the base fabric. The amount of the activated carbon powder adhered to the base fabric was 130 g/m$^2$, the pressure drop of the filter element was 12 Pa, the pressure drop of the base fabric after coating and drying the adhesive was 7 Pa. The filter element satisfied the relationship that $0\leq A\leq 1.05$ mB+C and m=0.28−0.0005 $D_{50}$, where $0<C\leq 8$, was satisfied. The results of measurement of the adsorption performance are shown in Table 1.

COMPARATIVE EXAMPLE 1

The same base fabric, adhesive and activated carbon used in Example 1 were used to manufacture a filter element by the fluidized adhesion method under the same conditions as indicated in Example 1 of Japanese Unexamined Patent Publication No. HEI 10-204384. As shown by the results in Table 1 including the adsorption performance, the pressure drop was large at 40 Pa.

TABLE 1

| | Pressure drop (Pa) | Adsorption (%) | | |
| --- | --- | --- | --- | --- |
| | | Toluene | Sulfur dioxide | n-Butane |
| Example 1 | 21 | 95 | 96 | 91 |
| Example 2 | 12 | 82 | 77 | 61 |
| Comparative Example 1 | 40 | 96 | 96 | 92 |

EXAMPLE 3

A filter element was manufactured in the same manner as Example 1, except that a heat-fusible fiber of nonwoven fabric (OEX by Kurashiki Textile Manufacturing Co., Ltd., fiber size: 17 dtex, mass perunit area: 64 g/m$^2$, thickness: 1.6 mm, pressure drop of nonwoven fabric alone: 3 Pa) was used as the base fabric. The amount of the activated carbon adhered to the base fabric was 330 g/m$^2$.

The filter element had a pressure drop of 17.5 Pa when measured by passing 25° C. air at 1 m/sec. The pressure drop of the base fabric after coating and drying the adhesive was 4.5 Pa. The relationship between the pressure drop and the amount of the activated carbon adhered to the base fabric satisfied the relationship that $0\leq A\leq 1.05$ mB+C and m=0.28−0.0005 $D_{50}$, where $0<C\leq 8$.

EXAMPLE 4 AND COMPARATIVE EXAMPLES 2–3

A nonwoven fabric (Spun Bond PK102 by Mitsui Chemical Co., Ltd., basis weight: 13 g/m$^2$) was provided on both sides of the filter element manufactured in Example 1, and the pressure drop and adsorption were measured. Two automobile filters of the same type by Japan Vilene Co., Ltd. mounted in commercial automobiles were also measured for pressure drop and adsorption. The results are shown in Table 2. The filter of Example 4 was clearly superior in terms of pressure drop and adsorption performance. The filter element was also worked into a pleated shape and cut, reinforced with a comb-shaped polypropylene reinforcing material at several locations on the back of the filter element and provided with a nonwoven fabric on the front for use as an air conditioner filter. Prolonged stable operation was possible, and the performance as a filter was satisfactorily adequate.

EXAMPLE 5 AND COMPARATIVE EXAMPLE 4

A nonwoven fabric (Spun Bond PK102 by Mitsui Chemical Co., Ltd., mass per unit area: 13 g/m$^2$) was provided on both sides of the filter element manufactured in Example 1, and after further providing an electret nonwoven fabric for air filtration, the pressure drop and adsorption were measured. An automobile filter of the same type by Japan Vilene Co., Ltd. mounted in a commercial automobile was also measured for pressure drop and adsorption. The results are shown in Table 2. The filter of Example 5 was clearly superior in terms of pressure drop and adsorption performance.

EXAMPLE 6 AND COMPARATIVE EXAMPLE 5

Activated carbon was adhered to only one side of a base fabric, and a filter element was manufactured by the same process as in Example 1. A nonwoven fabric was provided on both sides and the pressure drop and the adsorption were measured in the same manner as Example 4. For comparison, a commercial automobile-mounted automobile filter by Freudenberg Co. composed of the relatively low amount of the activated carbon adhered to the base fabric was also measured for pressure drop and adsorption (Comparative Example 5). The results are shown in Table 2. The filter of Example 6 was clearly superior in terms of pressure drop and adsorption performance.

TABLE 2

| | Total weight (g/m$^2$) | Amount of the activated carbon adhered to the base fabric (g/m$^2$) | Pressure drop (Pa) | Adsorption (%) | | |
|---|---|---|---|---|---|---|
| | | | | Toluene | Sulfur dioxide | n-Butane |
| Example 4 | 370 | 270 | 43.0 | 96.5 | 98.0 | 94.1 |
| Comparative Example 2 | 373 | 293 | 82.4 | 92.4 | 95.7 | 73.4 |
| Comparative Example 3 | 491 | 417 | 104.0 | 96.4 | 94.5 | 73.3 |
| Example 5 | 390 | 270 | 78.0 | 96.5 | 98.0 | 94.1 |
| Comparative Example 4 | 356 | 247 | 109.0 | 92.5 | 93.1 | 67.5 |
| Example 6 | 189 | 141 | 22.0 | 78.8 | 74.8 | 70.3 |
| Comparative Example 5 | 512 | 249 | 43.0 | 86.0 | 86.5 | 54.0 |

COMPARATIVE EXAMPLE 6

A filter element was manufactured in the same manner as Example 1, except that a heat-fusible fiber of nonwoven fabric (COLBACK50, CD50 by ACORDIS Co., fineness: 10–15 dtex, mass per unit area: 50 g/m$^2$, thickness: 0.34 mm, pressure drop of nonwoven fabric alone: 6.3 Pa) was used as the base fabric. The amount of the activated carbon adhered to the base fabric was 210 g/m$^2$, the pressure drop was 40 Pa, the pressure drop of the base fabric was 8 Pa after coating and drying the adhesive. When the thickness of the nonwoven fabric was too thin, high pressure drop resulted, relationship that $0 \leq A \leq 1.1$ mB+C and m=0.28–0.0005 $D_{50}$, where $0 < C \leq 15$ was not satisfied.

EXAMPLE 7

An emboss roll set to 120° C. was used to form regular hexagonal depressions bound by a bank width of 0.2 mm, a bank height of 0.7 mm, a bank side length of 2.0 mm and a bank angle (base angle indicating base of trapezoidal cross-section) of 60° in the heat-fusible fiber of nonwoven fabric used in Example 3, on both sides of the base fabric in a turtle-shell fashion, and a filter element was manufactured in the same manner as Example 3 except for using this nonwoven fabric as the base fabric. The pressure drop measured in the same manner was 25 Pa, and the pressure drop of the filter manufactured in the same manner as Example 4 was measured to be 45 Pa.

EXAMPLE 8

A filter element was manufactured by the same method using the same nonwoven fabric as in Example 3, except that activated carbon (GG26/60 35N) by Kuraray Chemical Co., Ltd. was adhered at 390 g/m$^2$ to the top side and palladium chloride-impregnated carbon (T-E32/60) by Kuraray Chemical Co., Ltd. was adhered at 345 g/m$^2$ to the bottom side. The filter element was cut to 400 mm×500 mm and housed in a 1 m$^3$ test box. Air containing 50 ppm $SO_2$ and 200 ppm CO was circulated through the filter element for 5 hours at a linear speed of 1 m/sec. This was repeated for 5 cycles, and the residual gas was analyzed.

For comparison, there were prepared filter elements with activated carbon (GG26/60 35N) by Kuraray Chemical Co., Ltd. adhered at 390 g/m$^2$ only to the top side of the filter element (Reference Example 1) and with palladium chloride-impregnated carbon (T-E32/60) by Kuraray Chemical Co., Ltd. adhered at 345 g/m$^2$ only to the bottom side of the filter element (Reference Example 2), air containing 50 ppm $SO_2$ and 200 ppm CO was circulated through the filter element for 5 hours at a linear speed of 1 m/sec in the same manner as before for 5 cycles, and the residual gas was analyzed.

Absolutely no $SO_2$ was detected in the residual gas with either of the filter elements. Also, compared to 100 as the CO residue rate for Reference Example 1, the CO residue rate was 80 for Reference Example 2 and 50 when activated carbon and palladium chloride-impregnated carbon were adhered, thus clearly showing an effect by the filter element with the activated carbon and palladium chloride-impregnated carbon adhered thereto.

INDUSTRIAL APPLICABILITY

According to the present invention there is provided a filter element exhibiting an excellent deodorizing function and adsorbing performance with low pressure drop, as well as a method for its manufacture and a filter using the element. Since the filter of the invention has an excellent deodorizing function and adsorbing performance as well as low pressure drop, as mentioned above, it can be suitably used as a filter for various uses, including automobile cabin filters, indoor air purification filters and air conditioner filters, which require high deodorizing and adsorption effects with low pressure drop.

What is claimed is:

1. A filter element having pulverized adsorbent powder adhered to an adhesive-coated base fabric surface, which satisfies the relationship that $0 < A < 1.1$ mB+C and m=0.28–0.0005 $D_{50}$, with the proviso that $0 < C < 15$, where $D_{50}$ (μm) is the 50% particle diameter of the pulverized adsorbent powder, B (g/m$^2$) is the amount of the pulverized adsorbent powder adhered to the base fabric, A (Pa) is the pressure drop of the filter element as measured at room temperature under an air flow rate of 1 m/ sec, and C (Pa) is the pressure drop of the base fabric coated with the adhesive and dried.

2. The filter element according to claim 1, wherein the 50% particle diameter $D_{50}$ of the pulverized adsorbent powder is 10–1000 μm and the standard deviation σ g for the particle size distribution of the adsorbent powder is 1.1–2.0.

3. The filter element according to claim 1 or 2, wherein the pulverized adsorbent powder is adhered to both sides of the base fabric.

4. The filter element according to claim 1, wherein said filter element is formed into a pleat form.

5. The filter element according to claim 1, wherein said the pulverized adsorbent powder is activated carbon powder.

6. The filter element according to claim 1, wherein said base fabric is a nonwoven fabric employing heat-fusible fibers.

7. The filter element according to claim 6, wherein said nonwoven fabric is a nonwoven fabric composed of core-sheath fibers.

8. The filter element according to claim 7, wherein the core and sheath sections of said core-sheath fibers are composed of polyethylene terephthalate.

9. The filter element according to claim 1, wherein said base fabric has a mass per unit area of 40–70 g/m$^2$ and a thickness of 0.5–3 mm and contains fibers with a fineness of 10–20 dtex.

10. The filter element according to claim 1, wherein protrusions are also formed in the base fabric.

11. A filter comprising a combination of a cover sheet with a filter element according to claim 1.

12. The filter according to claim 11 which comprises a reinforcing material.

13. A filter comprising a combination of a material having a catalytic function with a filter according to claim 11.

14. The filter according to claim 13, wherein said material having a catalytic function is palladium chloride-impregnated activated carbon or a molded product thereof.

15. A filter comprising a combination of an air filter and cover sheet with a filter element according to claim 1.

16. The filter according to claim 15, wherein the air filter and/or the cover sheet are nonwoven fabrics.

17. The filter according to claim 16, wherein said nonwoven fabric is a nonwoven fabric composed of core-sheath fibers.

18. The filter according to claim 17, wherein the core and sheath sections of said core-sheath fibers are composed of polyethylene terephthalate.

19. A method for manufacture of a filter element by coating a base fabric with an adhesive and allowing the fabric to move in an electrostatic field formed by a high voltage generating device to allow a pulverized adsorbent powder to electrostatically adhere to the base fabric surface wherein a 50% particle diameter $D_{50}$ of the pulverized adsorbent powder is 10–1000 μm and the standard deviation σg for the particle size distribution of the pulverized adsorbent powder is 1.1–2.0.

20. A method for manufacture of a filter element by dispersing a pulverized adsorbent powder on the surface of a base fabric comprising a nonwoven fabric of heat-fusible fibers, and then partially fusing the heat-fusible fibers by heating to allow the pulverized adsorbent powder to adhere to the base fabric surface wherein a 50% particle diameter $D_{50}$ of the pulverized adsorbent powder is 10–1000 μm and the standard deviation σg for the particle size distribution of the pulverized adsorbent powder is 1.1–2.0.

* * * * *